United States Patent [19]

Sherman et al.

[11] Patent Number: 4,852,545
[45] Date of Patent: Aug. 1, 1989

[54] APPARATUS FOR COOKING FOOD

[76] Inventors: Victor Sherman, 13-10 34 Ave., Long Island City, N.Y. 11106; Ilya Zborovsky, 6 Schoolhouse Way, Dix Hills, N.Y. 11746; William Sanchez, 35-69 169 St., Flushing, N.Y. 11358; Wladimir Kowalenko, 24 Witney Cir., Glen Cove, N.Y. 11542

[21] Appl. No.: 173,592

[22] Filed: Mar. 25, 1988

[51] Int. Cl.⁴ .......................... F24G 3/00; A47J 27/62
[52] U.S. Cl. ............................... 126/39 H; 126/41 R; 99/349; 99/351; 99/340
[58] Field of Search ............... 126/39 H, 41 R, 41 A, 126/41 B, 41 C; 99/349, 351, 350, 332, 340, 379; 100/93 P; 219/524, 525

[56] References Cited

U.S. PATENT DOCUMENTS

| | | | |
|---|---|---|---|
| 4,165,682 | 8/1979 | Weiss | 99/340 X |
| 4,483,239 | 11/1984 | Mueller et al. | 99/340 |
| 4,715,357 | 12/1987 | Sherman et al. | 126/39 H |

*Primary Examiner*—Larry Jones
*Attorney, Agent, or Firm*—Ilya Zborovsky

[57] ABSTRACT

An apparatus for cooking food has two plates which can be heated and of which one plates is movable relative to the other to apply heat and pressure to an initial food material for cooking the same, wherein a drive for moving the one plate is formed as a magnetic drive located laterally outside the contours of the plates.

9 Claims, 1 Drawing Sheet ial 4,852,545

APPARATUS FOR COOKING FOOD

BACKGROUND OF THE INVENTION

The present invention relates to apparatuses for cooking food.

More particularly, it relates to such an apparatus for cooking food in which the food is cooked by application of heat and pressure from two plates which confine the initial food material therebetween. Apparatuses of the above mentioned type are disclosed in our U.S. Pats. Nos. 4,627,335 and 4,715,357. One of the plates is movable relative to the other plate to open a cooking space for insertion of the initial food material or withdrawal of the cooked food, and also to close the space and apply the pressure to the initial food material for cooking. The drive for the movement of the plate was made as a magnetic drive as disclosed in our patent application Ser. No. This magnetic drive provides for several important advantages including the simplicity of the construction, low cost of manufacture, easy assembling of the apparatus etc. One disadvantage of the magnetic power drive disclosed in the above identified patent application is that it is located in the region of and within the contours of the plates themselves. This cause some difficulties in assembling of the apparatus and arrangement of other parts in the region of the plates. It is to be understood that elimination of the latter mentioned disadvantage is desirable.

SUMMARY OF THE INVENTION

Accordingly it is an object of the present invention to provode an apparatus for cooking food of the above mentioned general type which avoids the disadvantages of the prior art.

In keeping with these objects and with others which will become apparent hereinafter, one feature of the present invention resides, briefly stated in an apparatus for cooking food by applying heat and pressure to an initial food material by two plates, in which a drive for compressing the initial food material or applying a pressure thereto through one of the plates is formed as a magnetic power drive located laterally beyond the plates and outside the contours of the plates.

When the magnetic power drive is arranged in the inventive manner, a space in the region of the plates is vacated and other parts of the apparatus can be arranged in this space, thus making the apparatus more compact, simpler to assemble, easier and less exoensive to manufacture.

The novel features of the present invention are set forth in particular in the appended claims. The invention itself, however, both as to its construction and its manner of operation will be best understood from the following description of preferred embodiments which is accompanied by the following drawings.

DESCRIPTION OF A PREFERRED EMBODIMENT

Figure 1:
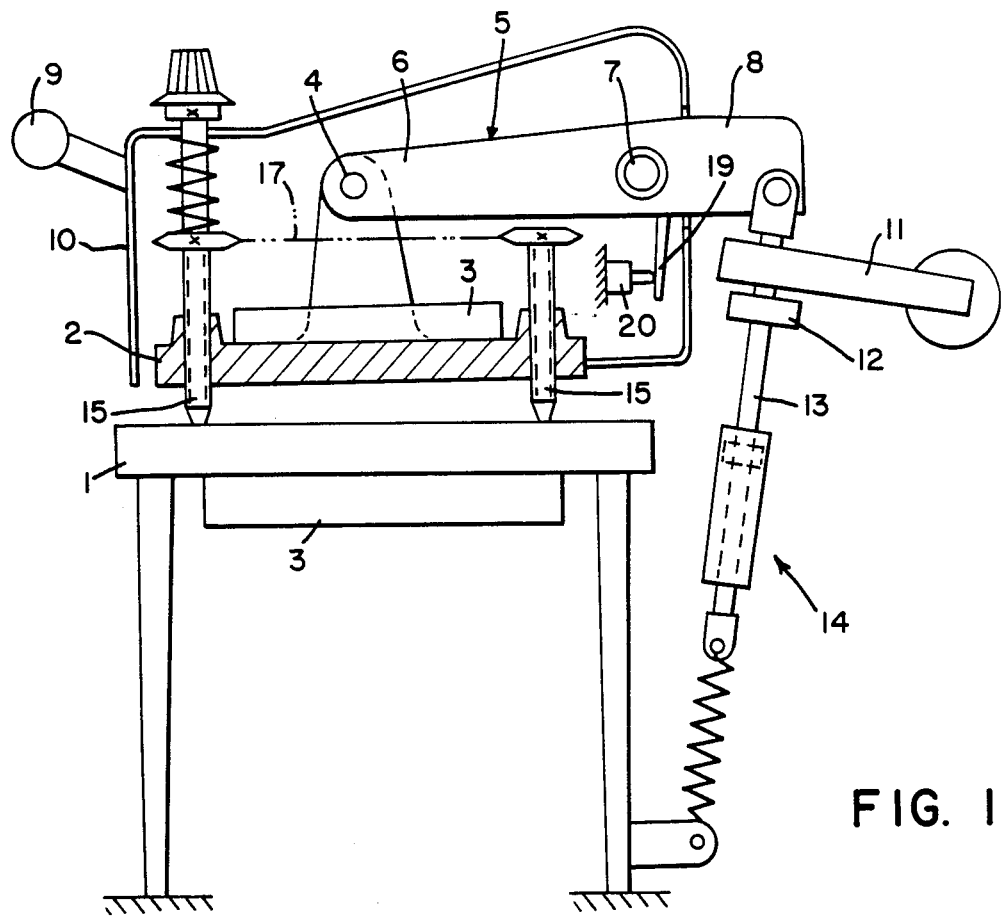
FIG. 1 is a side view of an apparatus for cooking food in accordance with the present invention.
Figure 2:
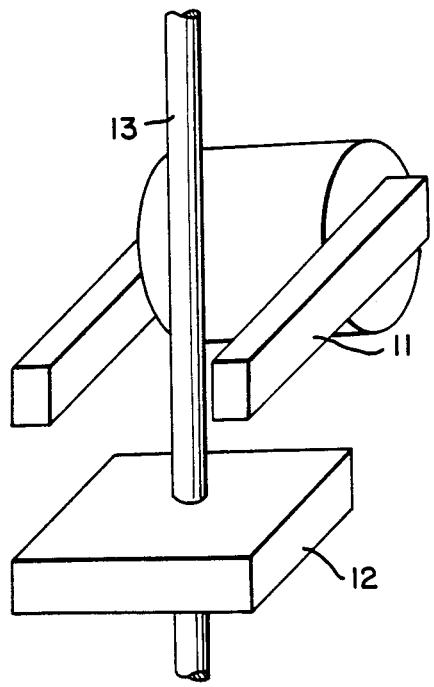
FIG. 2 is a perspective view of a magnetic power drive for movement of one of the cooking plates of the inventive apparatus.

An apparatus for cooking food in accordance with the present invention has a lower stationary plate 1 and an upper movable plate 2. The plates are provided with heaters 3 which are arranged at rear sides of the plates in direct contact therewith and can be supplied with electric current for heating the plates. The operation and control of the heaters are well known and therefore not discussed in detail.

The upper plate 2 is pivotally connected through a pivot 4 with one arm 5 of two- arm lever 6. The lever 6 is pivotally mounted on the lower plate through a pivot 7 and has another arm 8. By means of the lever 6 the upper plate 2 can be moved toward the lower plate 1 and away of the latter. This movement is performed by a drive which includes a manual drive unit and a power drive unit. The manual drive unit includes a handle 9 which is attached to a housing 10 of the uppe plate. The housing 10 is connected with the upper plate by means of the pivot 7. When a cooking space between the upper and lower plates has to be open for insertion of an initial food material to be cooked or for withdrawal of a cooked food, or closed in preparation for cooking, a user grasps the handle 9 and moves the housing 10 together with the upper plate away from the lower plate or toward the lower plate, respectively by turning around the pivot 7.

The power drive unit is formed as a magnetic power drive. It includes a stationary magnetic member 11 which can be attached to any stationary part of the cooking apparatus, and a movable magnetic member 12 which is attached to the arm 8 of the lever 7 through the rod 13. When the manual drive or more particularly a user brought the upper plate by the manual drive to a position which is close to an upper surface of an initial food material placed on the lower plate, the magnetic drive is actuated and the magnetic member 12 is attracted to the magnetic member 11 so that the rod 13 is pushed upwardly together with the arm 8, while the arm 5 together with the upper plate 2 is moved forcedly downwardly so as to apply a pressure to the initial food material and somewhat compresses the latter to cook by heat and pressure.

The distance between the magnetic members 11 and 12 can be adjusted within wide range of distances. This can be achoved by moving the stationary member 11 toward or away of the movable member 12, for example by an adjusting screw.

As can be seen from the drawing, the rod 13 is a movable member of a spring and/ hydraulic and/or pneumatic damper 14, thus performing a double function of carrying the movable magnetic member 12 and performing a part of dampening functions. The distance between the members 11 and 12 can also be adjusted by changing the position of the movable member 12 on the rod 13.

The apparatus is further provided with means for limiting the final thickness of the food cooked in it. The limiting means includes a plurality of threaded members 15 extending through threaded openings of the upper plate and connected with sprockets16, a chain 17 which runs around the sprockets, and an adjusting knob 18 which turns one of the sprockets 16, so that all threaded members 15 extend farther from the upper plate or closer to the latter. During the movement of the upper plate toward the lower plate, the lower ends of the threaded members abut against the lower plate, to insure a desired distance therebetween and therefore a desired thickness of the finally cooked food.

For actuating the magnetic power drive 11,12 in the desired position, at the very end of preliminary movement of the upper plate toward the lower plate just before starting the compression of the food material, a switch is provided. The switch includes a movable switch member 19 which is mounted on and turns together with the pivot 7. The pivot 7 is connected with the housing 10, while the level 5 freely rotates about the pivot 7. The switch further includes an immovable switch element 20 located in an electric circuit of the electromagnetic member 11. When the housing is turned by a user by means of the handle 9 and reaches a close position in which it substantially closes the cooking space between the plates the switch element 19 makes an electric contact with the switch element 20 and closes the electric circuit of the electromagnetic drive 11,12 to actuate the latter. At said moment the element 12 is attracted to the element 11 and the lever is turned to apply pressure to the upper plate and through the latter to the food material.

The invention is not limited to the details shown since various modificatins and structural changes are possible without departing in any way from the spirit of the invention.

What is desired to be protected by Letters Patent is set forth in particular in the appended claims.

1. An apparatus for cooking food, comprising
  at least two plates arranged to confine an initial food material therebetween and to cook the same;
  means for heating said plates;
  means for moving at least one of said plates relative to the other of said plates between a distal position in which said one plate is spaced from said other plate so that the initial food material can be introduced between the plates, and a proximal position in which said one plate is located close to said other plate so that the initial food material is somewhat compressed and cooked by heat and pressure applied thereto by said plates, said moving means including power drive means arranged to apply pressure to said one plate and therefore to the initial food material, said power drive means being formed as magnetic power drive means and located laterally outside of said plates, said one plate being pivotable relative to said other plate between said two positions; and
  two-arm lever having one arm which is connected with said one plate, another arm having a portion which is located laterally outside of said plates and connected with said magnetic power drive means, and a pivot which defines a pivot point of said two-arm lever.

2. An apparatus for cooking food as defined in claim 1, wherein said magnetic power drive means includes a stationary magnetic member, and a movable magnetic member which is connected with said portion of said other arm of said lever and attractible to said stationary magnetic member.

3. An apparatus for cooking food as defined in claim 2; and further comprising a dampening element arranged to dampen the movement of said one plate and connected with said other arm of said two-arm lever.

4. An apparatus for cooking food as defined in claim 3, wherein said dampening element includes a movable part and an immovable part, said movable magnetic member being connected with said movable part of said dampening element and movable together therewith.

5. An apparatus for cooking food as defined in claim 1; and further comprising manual drive means arranged so that said manual drive means move said one plate manually away from said other plate and also move manually said one plate toward said other plate substantially without applying a pressure by said one plate to the initial food material, while said power drive means is arranged to move said one plate further toward said other plate so as to apply pressure to the initial food material for cooking the latter.

6. An apparatus for cooking food as defined in claim 5, wherein said manual drive means includes a handle element arranged to be grasped by a user manually and connected with said one plate.

7. An apparatus for cooking food as defined in claim 1; and further comprising a housing and switch means actuatable when said housing approaches close to said proximal position and which is connected with said magnetic power drive means to actuate the latter in response to the actuation of said switch means.

8. An apparatus for cooking food as defined in claim 1; and further comprising a housing and switch means actuatable when said housing approaches close to said proximal position and which is connected with said magnetic power drive means to actuate the latter in response to the actuation of said switch means, said switch means including an immovable switch member and a movable switch member which is connected with said lever and cooperates with said immovable switch member.

9. An apparatus for cooking food, comprising
  at least two plates arranged to confine an initial food material therebetween and cook the same;
  means for heating said plates;
  means for moving at least one of said plates relative to the other of said plates between a distal position in which said one plate is spaced from said other plate so that the initial food material can be introduced therebetween, and a proximal position in which said one plate is located close to said other plate so that the initial food material is somewhat compressed and cooked by heat and pressure applied thereto by said plates, said moving means including power drive means arranged to apply pressure to said one plate and therefore to the initial food material, said one plate being pivotable relative to said other plate; and
  two-arm lever having one arm which is connected with said one plate, another arm having a portion which is located laterally outside of said plates and connected with said power drive means, and a pivot which defines a pivot point of said two-arm lever.

* * * * *